Feb. 21, 1939.   W. E. BAIER   2,147,960
METHOD OF MAKING FOOD PRODUCTS
Filed Oct. 1, 1936
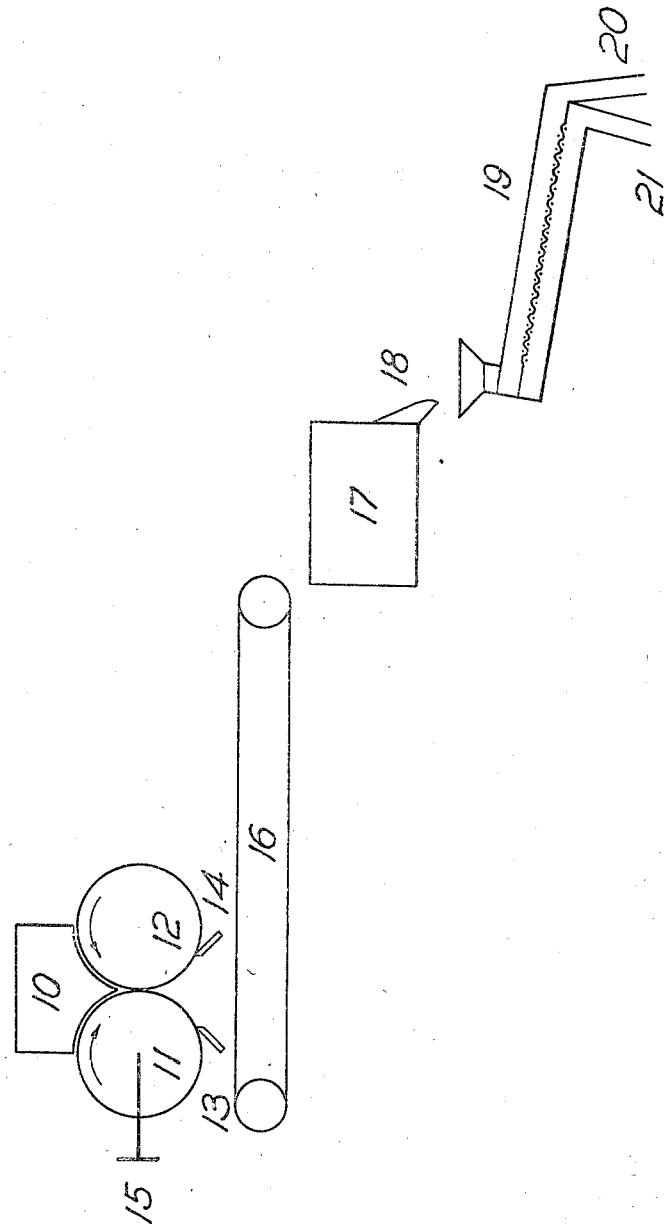
Inventor
Willard E. Baier,
By Robert E. Harris
Attorney Patented Feb. 21, 1939

2,147,960

UNITED STATES PATENT OFFICE 2,147,960

METHOD OF MAKING FOOD PRODUCTS

Willard E. Baier, Ontario, Calif., assignor to California Fruit Growers Exchange, Los Angeles, Calif., a corporation of California Application October 1, 1936, Serial No. 103,575

5 Claims. (Cl. 99—132)

This invention relates to pectin products, and methods for the preparation thereof.

Pectin solutions are very readily used in the preparation of jams, jellies, and other products into which pectin may enter, and as a consequence solutions of pectin have been very widely used commercially. These, however, are subject to two pronounced disadvantages. First, pectin solutions can ordinarily be prepared only in concentrations up to about 5% pectin, by weight. Handling and carriage charges per unit of pectin are therefore high. Second, pectin solutions are very subject to spoilage, and must be handled in sterile closed containers, and must be protected from contamination after being opened. Moreover, pectin solutions must be protected from freezing.

To obviate these disadvantages, dry pectin has been extensively used. Dry pectin, however, is a hard, horny substance that does not go into solution easily. In lump form, it swells slowly in water, and dissolves only after a long time. When in powdered form, and placed in water, it forms instantly into clumps or balls of powder, each ball or lump having a continuous film of wet, sticky pectin on its surface, but being dry on the inside. Such clumps are difficult to break up to permit wetting of the pectin in the interior of the clumps, hence they are very slow to dissolve.

To overcome this clumping, or balling, or "lumping", of powdered pectin it has been proposed to mix the finely powdered pectin with finely powdered sugar, or salt, or other suitable substance. Such mixtures can be used in the manufacture of jams, jellies, and the like, and in fact have been very widely used commercially. If enough other material is mixed in to disperse the individual particles of pectin and prevent them for coalescing to form clumps, the finely powdered pectin particles will go into solution quickly, especially with boiling. These mixtures, however, are subject to two distinct disadvantages.

In the first place the mixtures of powdered pectin and, for example, powdered sugar are in such a fine state of subdivision that in handling the material in getting a portion out of the barrel or keg, in weighing it, in adding it to a jelly batch, and so forth, a goodly amount of dust is caused, giving rise to some loss of material and, particularly, causing annoyance to the user.

In the second place, in order to overcome the clumping or balling tendency rather completely, and give a really satisfactory dispersion, and thus effectively permit solution of the pectin in the water or fruit juice, an amount of powdered sugar or the like, not less than several times the weight of the pectin must be mixed therewith. Thus either the manufacturer of the pectin must sell a product which is predominantly sugar, and the product be burdened with freight charges on this large excess of sugar; or the user must first intermix with the pectin product he has purchased a further proportion of sugar before he can get it dissolved in the fruit juice or water.

Pectins as produced from time to time commercially will vary in jelly grade.

By jelly grade is meant the weight of soluble solids which a given weight of pectin will set to a satisfactory jelly, the active acidity and per cent of soluble solids in the jelly being kept constant.

Dry pectin as at present produced commercially from apples may vary from about 120 grade to about 160 grade. As produced commercially from citrus fruits, dry pectins may vary from about 140 grade to about 200 grade, or occasionally somewhat higher. Dry apple pectin is usually marketed as 80 grade or 100 grade. Dry citrus pectin is at present ordinarily marketed as 100 grade, enough powdered sugar being added in each case to dilute the pectin as produced to the strength which it is desired to market.

The above commercial strengths of pectin will, clearly therefore, contain not more than approximately one part of powdered sugar for each part of powdered pectin. Such mixtures exhibit to a marked degree the clumping or balling referred to above. It is necessary then for the user of such a preparation to mix with it a further portion of sugar, to enable the pectin to go into solution readily. And he must allow for this added sugar when calculating the amount to be put into the final batch.

I have now discovered that it is possible to prepare from the strengths of pectin as now produced commercially, a dry pectin of 80 to 100 grade having all of the advantages of dry pectin preparations and none of the disadvantages enumerated above. In particular, I avoid the dusting of the fine powder, and the clumping or balling when placed in contact with liquid. Moreover, I retain the rapid solubility obtained by having the individual pectin particles finely powdered.

I accomplished this by binding the pectin particles together into aggregates of suitable size by means of a water-soluble binding agent. A suitable material for this purpose is a hydrated dextrose of high purity which is now available commercially. Hydrated dextrose is an edible substance which is solid at all atmospheric temperatures.

Accordingly, an object of the present invention is to provide and disclose methods and means for preparing a rapidly soluble pectin preparation which will not dust or lump in use.

Another object of the invention is to provide and disclose pectin preparations comprising pectin and a water-soluble binding substance, the preparation being in such form as greatly to lessen dusting and lumping of the material in use.

Other objects, uses, and advantages will appear more fully and at large hereinafter. Some will be obvious from a reading of the description and claims, and others will appear to those skilled in the art in the contemplation and use of the invention.

In putting my invention into practice, I may make use of devices such as those schematically shown in the accompanying drawing, in which 10 designates a hopper, 11 and 12 are rollers, suitably of polished steel and arranged to be heated, 13 and 14 are scrapers, 15 is an arrangement for varying pressure between the rolls, 16 is a conveyor, 17 is a device for comminuting or subdividing the pectin preparation, with a discharge outlet indicated at 18; 19 is a screening device, and 20 and 21 are discharge outlets.

In one embodiment of my invention, I may work with a 100 grade mixture comprising approximately equal parts of pectin in powder form and powdered dextrose hydrate.

Steam is let into the interior of the rolls until a gauge pressure of, say, 10 pounds per square inch is maintained. Or, if desired, one roll may be carried at or below a steam pressure equivalent to atmospheric pressure, and the other at 10 pounds, or thereabout. The preparation then seems to tend to adhere to the hotter roll.

The pressure on the rolls is adjusted until they are lightly yet firmly pressed together, so that a strong pressure is exerted upon the mixture as it passes between the rolls. The mixture of pectin and dextrose is then placed in the hopper, and allowed to pass between the rolls, which may turn at a speed equal to about 40 linear feet per minute, at the surface of the rolls.

As the mixture passes between the rolls, the dextrose hydrate, under the influence of the temperature and pressure, seems to undergo, momentarily, an incipient liquefaction. As soon as it passes the point of pressure, and particularly as soon as it has left the heated rolls, it begins to harden again; and when cool, the product will be in flake form, fairly brittle, but not so readily friable as to be incapable of being handled in a normal manner without shattering and returning to its original finely powdered or dusty condition. Although I have not made any microscopic examination of this product, I envision it as essentially a matrix of dextrose hydrate, in which the particles of powdered pectin are embedded.

I find it to be desirable to provide one or both rolls with scrapers, to be sure that all material is removed therefrom. Some of the particles of material may be of a size suitable for use. Some of the flakes formed may be several square inches in area. Some of the material may seem to be in substantially the original powdered condition. These results may vary with the particular combinations of temperature, pressure, and roll speed employed.

The pectin preparation may, if desired, be passed by means of the conveyor 16 to the comminuter 17. Whatever cooling may be necessary may take place on the conveyor. In the comminuter it may be subdivided so as to be all below some previously determined maximum particle size. For example, it may be reduced so as to pass through a screen having 20 meshes per inch.

The preparation may now be discharged, as at 18, to a screening device 19, where all particles smaller than some previously determined minimum size may be separated out. For example, particles passing through a screen having 48 meshes per inch, may be removed.

The finished product, of selected maximum and minimum sizes, may be discharged at 20, and the finer material at 21.

If desired the fine portion may be returned to the hopper 10 for re-running. I find that such material may, upon being passed through the rolls a second time, be firmed up into flake form.

It will be obvious that my method is not limited to the use of any particular apparatus. Neither is it limited to the particular operating conditions suggested, since these will be capable of being varied over reasonably wide limits. The operating conditions needed will depend upon the particular fusible substance incorporated with the pectin, the thickness of flake wanted and the mechanical strength desired in the flake.

Obviously, the field of substance fusible by a combination of temperature and pressure may be very broad. However, many such substances would not be selected in making a preparation intended for use in jams and jellies. For other uses, more latitude in the selection of the fusible substance incorporated might be permissible.

In making a pectin preparation using dextrose hydrate as the fusible substance, a preparation having a jelly grade of 80 or 100 may be prepared from almost any of the dry powdered pectins produced commercially. With the higher grade citrus pectins, the jelly grade of the preparation may be as high as 160 grade, or even higher.

It will be obvious that no particular limits of particle sizes need to be chosen. The particles should be coarse enough to prevent dusting and lumping, and will preferably be reduced to a sufficiently small size to provide a pleasing appearance and a satisfactory rate of solution.

If it be desired to produce a lower grade product, this may be done by adding the dextrose, for example, before the rolling operation. Or dextrose and/or other material which it may be desired to incorporate may be mixed with the preparation after the rolling, screening, etc.

Obviously, numerous changes and modifications may be introduced without departing from the spirit of my invention. All such changes and modifications as come within the scope of the appended claims are intended to be embraced thereby.

Having thus described my invention in such full, clear, concise, and exact language as to enable others skilled in this art to make, compound, and use the same, I claim as my invention and desire to secure by Letters Patent the following:

1. In the preparation of a pectin product, the steps of passing a mixture of powdered pectin and dextrose hydrate between hot rolls, whereby a portion of the mixture is converted into integral flakes, reducing larger flakes to a size permitting ready solution, and screening out the fines that would cause lumping.

2. In the preparation of a pectin product, the step of passing a mixture of powdered pectin and dextrose hydrate between hot rolls, whereby a portion of the mixture is converted into integral flakes.

3. In the preparation of a pectin product, the steps of passing and pressing a mixture of powdered pectin and dextrose hydrate between hot moving surfaces, whereby a portion of the mixture is converted into integral flake form, reducing larger flakes to a size permitting ready solution, and screening out the fines that would cause lumping.

4. In the preparation of a pectin product, the step of passing and pressing a mixture of powdered pectin and dextrose hydrate between hot moving surfaces, whereby a portion of the mixture is converted into integral flake form.

5. In the preparation of a pectin product, the steps of mixing powdered pectin with dextrose hydrate, and simultaneously subjecting the mixture to heat and pressure between rolls.

WILLARD E. BAIER.